US007623341B1

(12) United States Patent
Salvat et al.

(10) Patent No.: US 7,623,341 B1
(45) Date of Patent: Nov. 24, 2009

(54) DIGITAL PICTURE FRAME WITH HIDDEN MIRROR ASSEMBLY

(76) Inventors: Hilda E. Salvat, 322 Manor Pl., Coral Gables, FL (US) 33133; Aymee M. Curbelo, 1540 Zoreta Ave., Coral Gables, FL (US) 33146

( * ) Notice: Subject to any disclaimer, the term of this patent is extended or adjusted under 35 U.S.C. 154(b) by 0 days.

(21) Appl. No.: 12/186,069

(22) Filed: Aug. 5, 2008

(51) Int. Cl.
*H05K 5/00* (2006.01)
(52) U.S. Cl. .............. 361/679.01; 345/905; 359/896
(58) Field of Classification Search ............ 361/679.24, 361/679.25, 679.01; 359/871, 896; 296/97.1; 345/905
See application file for complete search history.

(56) References Cited

U.S. PATENT DOCUMENTS

| 4,810,023 | A * | 3/1989 | Kawada ............... 296/97.8 |
|---|---|---|---|
| 6,191,939 | B1 * | 2/2001 | Burnett ............... 361/679.1 |
| 6,244,718 | B1 * | 6/2001 | Whitcomb ............ 359/872 |
| 6,424,823 | B1 * | 7/2002 | Moles ................. 455/90.1 |
| 6,525,750 | B1 * | 2/2003 | Knox .................... 345/30 |
| 6,768,634 | B2 * | 7/2004 | Kim ................... 361/679.09 |
| 2003/0090123 | A1 * | 5/2003 | Sturt ................... 296/97.8 |
| 2004/0008474 | A1 * | 1/2004 | Kardach et al. ....... 361/681 |
| 2005/0012758 | A1 * | 1/2005 | Christou .............. 345/619 |
| 2005/0212944 | A1 * | 9/2005 | Guy ................. 348/333.07 |
| 2006/0018088 | A1 * | 1/2006 | Gitzinger et al. ...... 361/681 |
| 2007/0097615 | A1 * | 5/2007 | Liao et al. ............ 361/683 |
| 2008/0123266 | A1 * | 5/2008 | Hung ................... 361/681 |
| 2009/0009530 | A1 * | 1/2009 | Araki et al. ........... 345/619 |
| 2009/0102821 | A1 * | 4/2009 | Pargman et al. ....... 345/204 |

FOREIGN PATENT DOCUMENTS

FR         2860939 A1 *   4/2005

* cited by examiner

*Primary Examiner*—Alessandro Amari
*Assistant Examiner*—Mark Consilvio
(74) *Attorney, Agent, or Firm*—Albert Bordas, P.A.

(57) ABSTRACT

A monitor having a hidden mirror assembly. It comprises a housing assembly. A rail assembly is housed within the housing assembly. A mirror assembly comprises a frame and a mirror. The mirror assembly is slidably mounted onto the rail assembly. A base assembly supports the housing assembly. The rail assembly comprises a dividing wall. A top rail extends a first predetermined distance across a top edge from the dividing wall, and a bottom rail that extends a second predetermined distance across a bottom edge from the dividing wall. The top and bottom rails comprise stoppers having cooperative dimensions and shape to permit the mirror assembly to snugly slide in and out along the top and bottom rails. The frame also comprises stoppers that prevent the mirror assembly from sliding completely out of the rail assembly when meeting the first stoppers. The front wall defines a frame for a monitor.

1 Claim, 5 Drawing Sheets

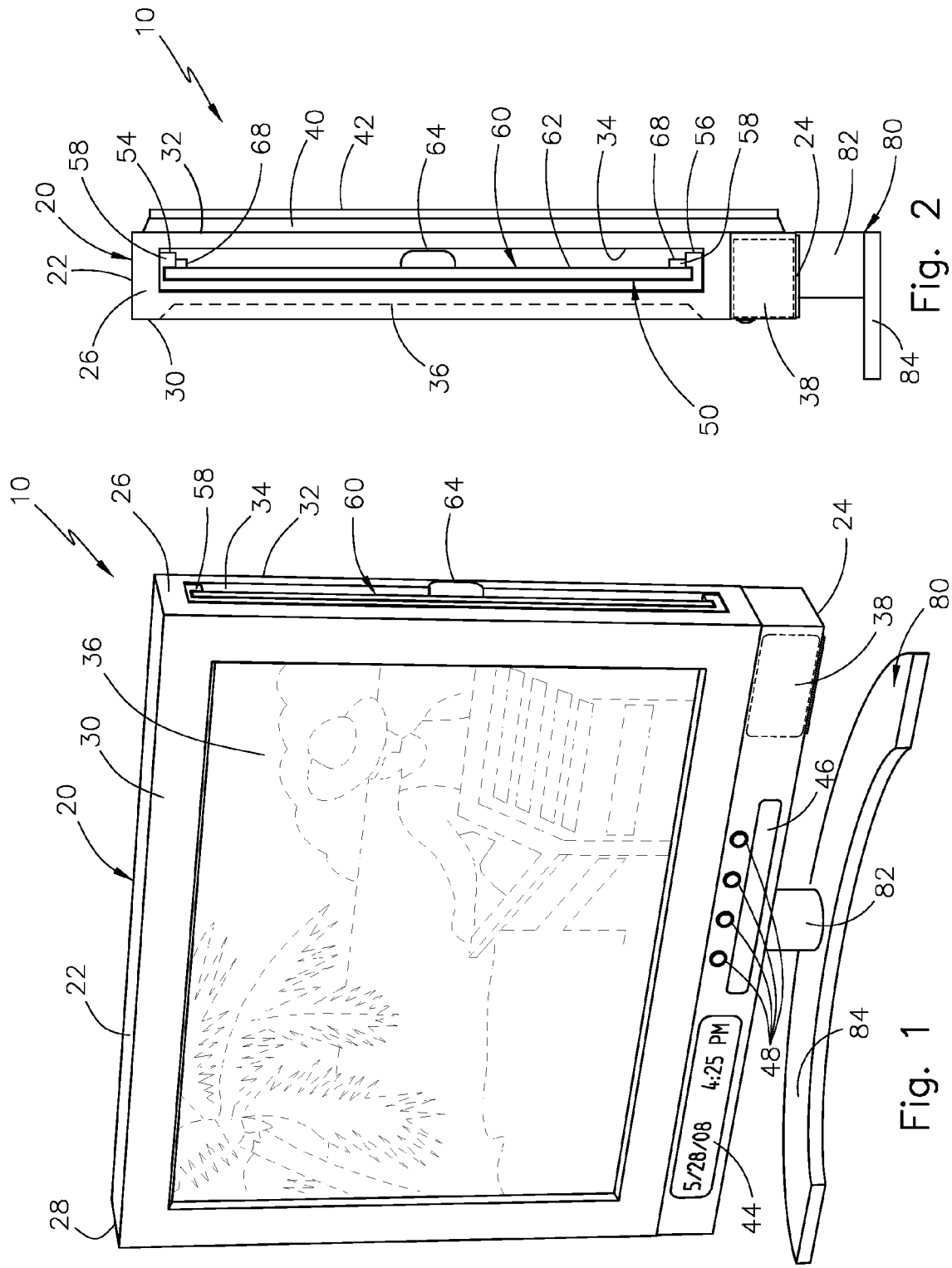

DIGITAL PICTURE FRAME WITH HIDDEN MIRROR ASSEMBLY

BACKGROUND OF THE INVENTION

1. Field of the Invention

The present invention relates to monitors, and more particularly, to electronic picture monitors having accessories.

2. Description of the Related Art

Many picture frames and electronic picture monitors have been developed in the past. None of them, however, include a hidden mirror assembly.

SUMMARY OF THE INVENTION

The present invention is a monitor having a hidden mirror assembly. It comprises a housing assembly. A rail assembly is housed within the housing assembly. A mirror assembly comprises a frame and a mirror. The mirror assembly is slidably mounted onto the rail assembly. A base assembly supports the housing assembly, and in the preferred embodiment, the base assembly is a removable base assembly comprising a post extending from a base.

In the preferred embodiment, the housing assembly comprises a top wall, a bottom wall, first and second lateral walls, a front wall, and a rear wall. The housing assembly further comprises a laminate that covers an adhesive layer, which in turn covers the rear wall. The rail assembly is internally mounted within the housing assembly and it comprises a dividing wall. The rail assembly further comprises a top rail that extends a first predetermined distance across a top edge from the dividing wall, and a bottom rail that extends a second predetermined distance across a bottom edge from the dividing wall. The top rail is in an inverted position with respect to the bottom rail. The top and bottom rails comprise a first at least one stopper having cooperative dimensions and shape to permit the mirror assembly to snugly slide in and out along the top and bottom rails. The frame comprises a second at least one stopper that prevents the mirror assembly from sliding completely out of the rail assembly when meeting the first at least one stopper.

The front wall defines a frame for a monitor. The monitor has means to display visual images as electronic pictures. In an alternate embodiment, the monitor is a visual display unit, which displays images generated from a video output of devices without producing a permanent record. The images are stored in a computer chip inserted into the housing assembly. In the preferred embodiment, the monitor is of a thin film transistor liquid crystal display, and comprises circuitry to generate and format a picture from video sent by the signals source that is contained within the housing assembly. The monitor further comprises within the signal source, a display adapter to generate video in a format compatible with the monitor.

It is therefore one of the main objects of the present invention to provide a monitor having a hidden mirror assembly.

It is another object of this invention to provide a monitor having a hidden mirror assembly that is compact and easily accessible.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is an isometric view of the instant invention.

FIG. 2 is a side elevational view of the instant invention.

DETAILED DESCRIPTION OF THE PREFERRED EMBODIMENT

Figure 3:
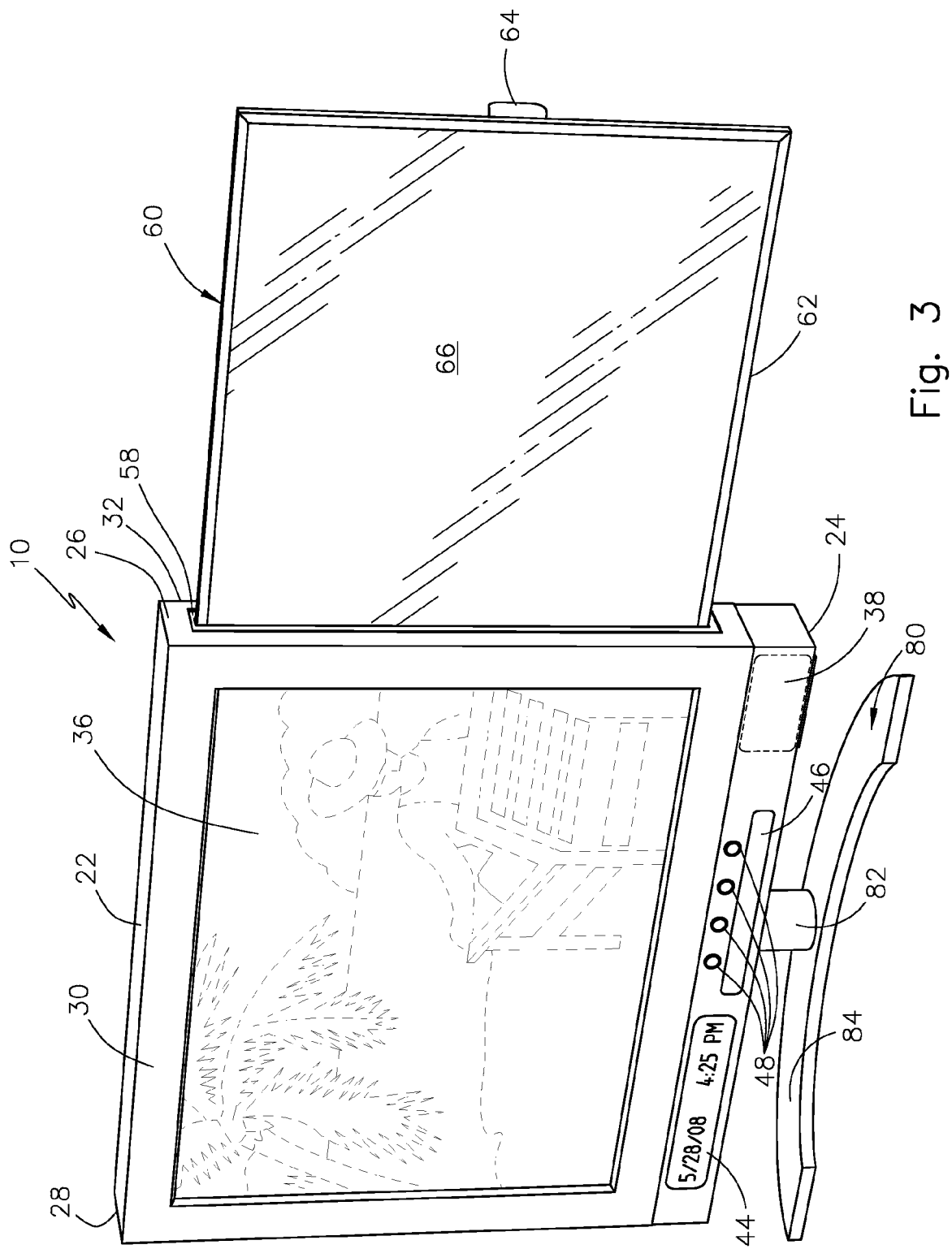
FIG. 3 is an isometric view of the instant invention with its mirror assembly in an extracted position.

Referring now to the drawings, the present invention is generally referred to with numeral 10. It can be observed that it basically includes housing assembly 20, rail assembly 50, mirror assembly 60, and removable base assembly 80.

As seen in FIGS. 1 and 2, housing assembly 20 comprises top wall 22, bottom wall 24, lateral walls 26 and 28, front wall 30 and rear wall 32. Lateral wall 26 has aperture 34 longitudinally disposed in between top wall 22 and bottom wall 24. Front wall 30 defines a frame for monitor 36, and more specifically, in the preferred embodiment, housing assembly 20 defines a digital picture frame, whereby monitor 36 has means to display visual images. More specifically, monitor 36 is a liquid crystal display. In the preferred embodiment, instant invention 10 is a device about the size and shape of an ordinary picture frame that sits upon a desk. Monitor 36 displays multiple photos in a slideshow format. Such photos are stored in a computer chip, not seen, that is inserted into slot 46. Although not illustrated, housing assembly 20 houses a central processing unit for downloading pictures. Although not illustrated, housing assembly 20 may also comprise ROM memory to store an operating system, and also has flash memory for pictures, settings, and operating software live. As an example, monitor 36 can be a 640×480-pixel, passive-matrix liquid crystal display with a viewing area of about 5 by 7 inches (13 by 18 cm). This type of monitor 36 is thin enough that instant invention 10 isn't much thicker than an ordinary picture frame. Monitor 36 can display pictures in 12-bit color, which means that approximately 4,100 different colors can be presented on its screen. Monitor 36 is powered by a battery source within battery compartment 38.

As an alternate embodiment, monitor 36 can also display images generated from a video output of devices such as a computer, not seen, without producing a permanent record. Such images are stored in a computer chip, not seen, that is inserted into slot 46. Although not illustrated, it is noted that monitor 36 comprises simple circuitry to generate and format a picture from video sent by the signals source that is contained within housing assembly 20. Additionally, although not illustrated, it is noted that monitor 36 also comprises within the signal source, either as an integral section or a modular component, a display adapter to generate video in a format compatible with monitor 36. As in the preferred embodiment, monitor 36 is powered by a battery source within battery compartment 38.

Housing assembly 20 also comprises digital display 44 illustrating data such as date and/or time. Control buttons 48 control the functionality of instant invention 10, specifically including at least a monitor on/off switch, and a control/reset date, and/or time date, and the brightness of monitor 36. Housing assembly 20 in mounted upon removable base assembly 80 that comprises post 82 extending from base 84.

As best seen in FIG. 2, laminate 42 covers adhesive layer 40, which in turn covers rear wall 32. If a user desires to mount instant invention 10 onto a surface or wall for example, the user would remove removable base assembly 80 from bottom wall 24. Laminate 42 would then be removed and the user would place a predetermined force onto front wall 30 to enable adhesive layer 40 to adhere onto the surface or wall.

Figure 4:
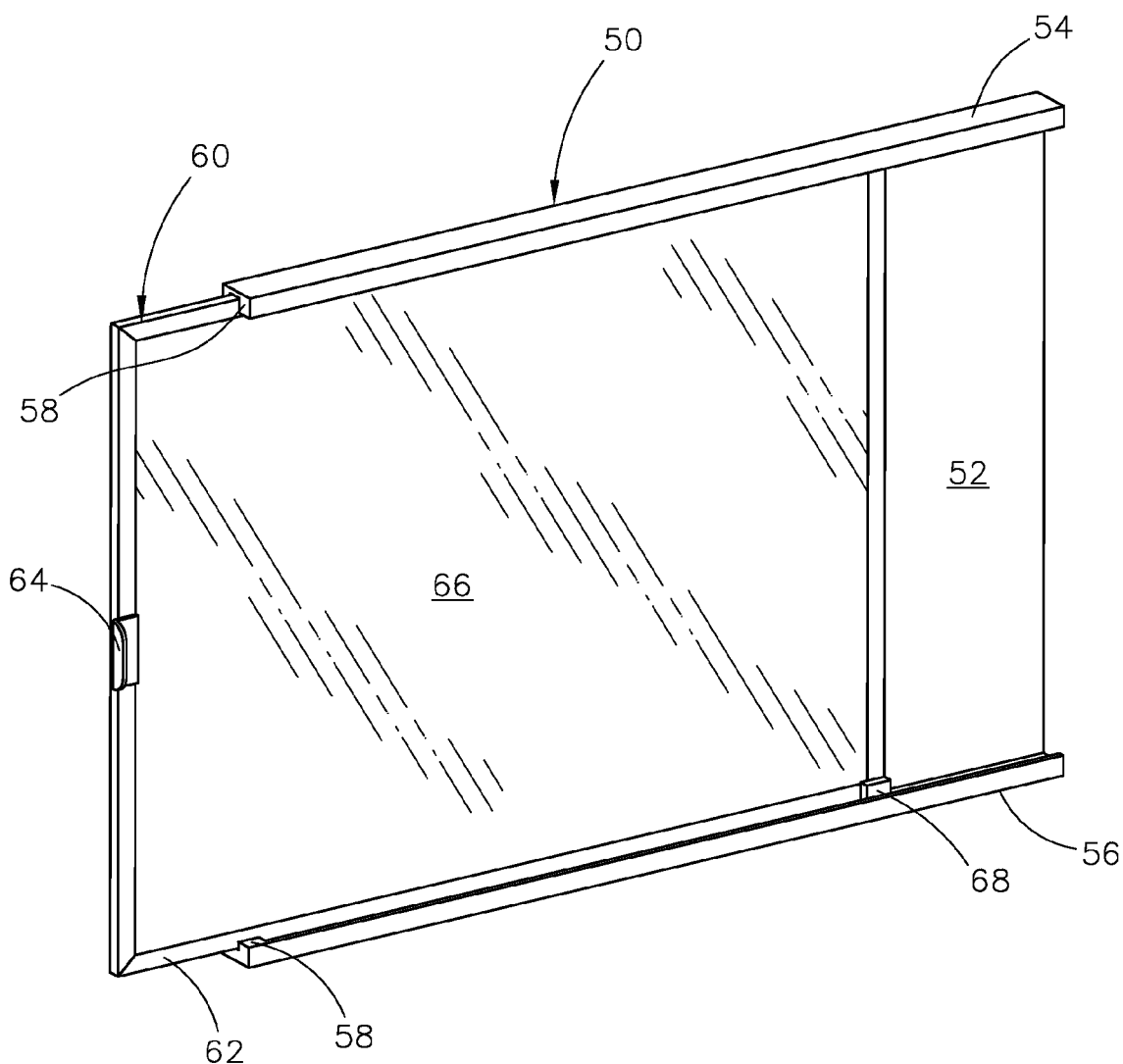
FIG. 4 is an isometric view of the mirror assembly mounted onto a rail assembly.

As seen in FIGS. 3 and 4, mirror assembly 60 comprises frame 62 with handle 64 and mirror 66. Mirror assembly 60 is slidably mounted onto rail assembly 50. Mirror assembly 60 also comprises stoppers 68 mounted to an interior top and bottom corner of frame 62. Rail assembly 50 is internally mounted within housing assembly 20. Rail assembly 50 comprises dividing wall 52. Top rail 54 extends a predetermined distance across a top edge from dividing wall 52. Similarly, bottom rail 56 extends a predetermined distance across a bottom edge from dividing wall 52. Bottom rail 56 is in an inverted position with respect to top rail 54. Stoppers 58 are fixed at distal ends of top and bottom rails 54 and 56. Stoppers 58 have cooperative dimensions and shape to permit mirror assembly 60 to snugly slide in and out along top and bottom rails 54 and 56, thus extracting and retracting. Additionally, stoppers 58 interact with stoppers 68 to prevent mirror assembly 60 from sliding completely out of rail assembly 50.

Figure 5:
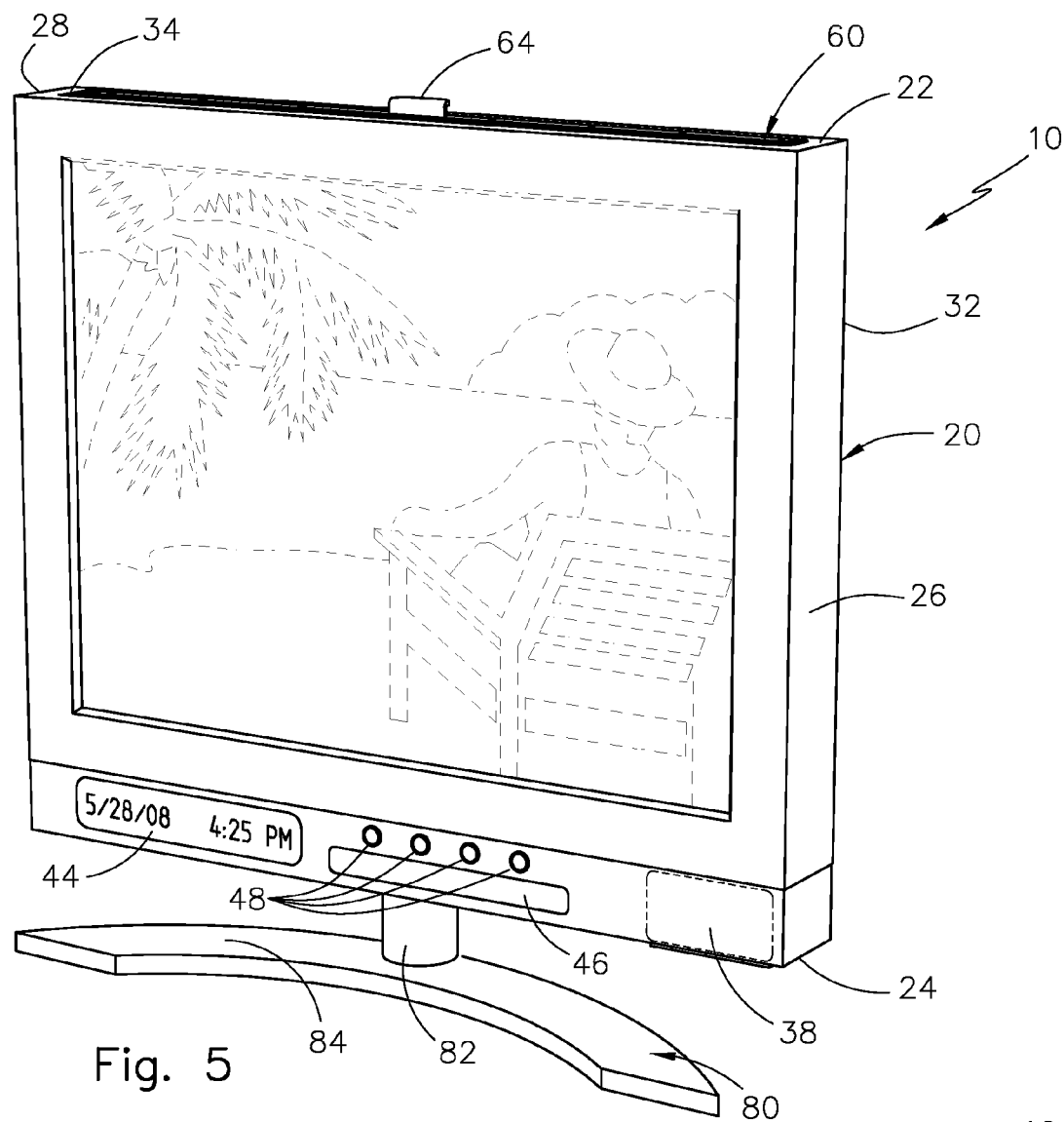
FIG. 5 is an isometric view of an alternate embodiment of the instant invention.
Figure 6:
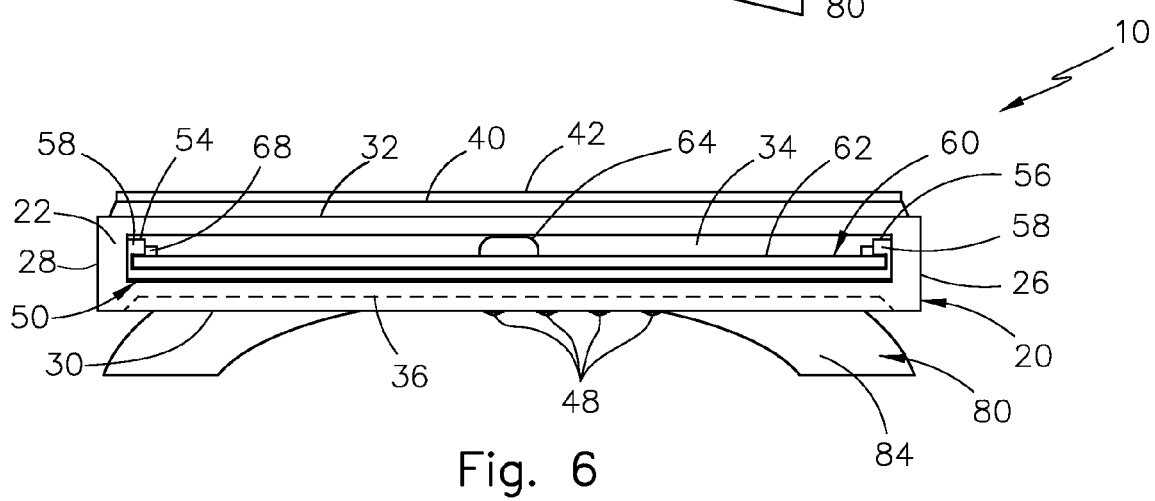
FIG. 6 is a top plan view of the instant invention seen in FIG. 5.
Figure 7:
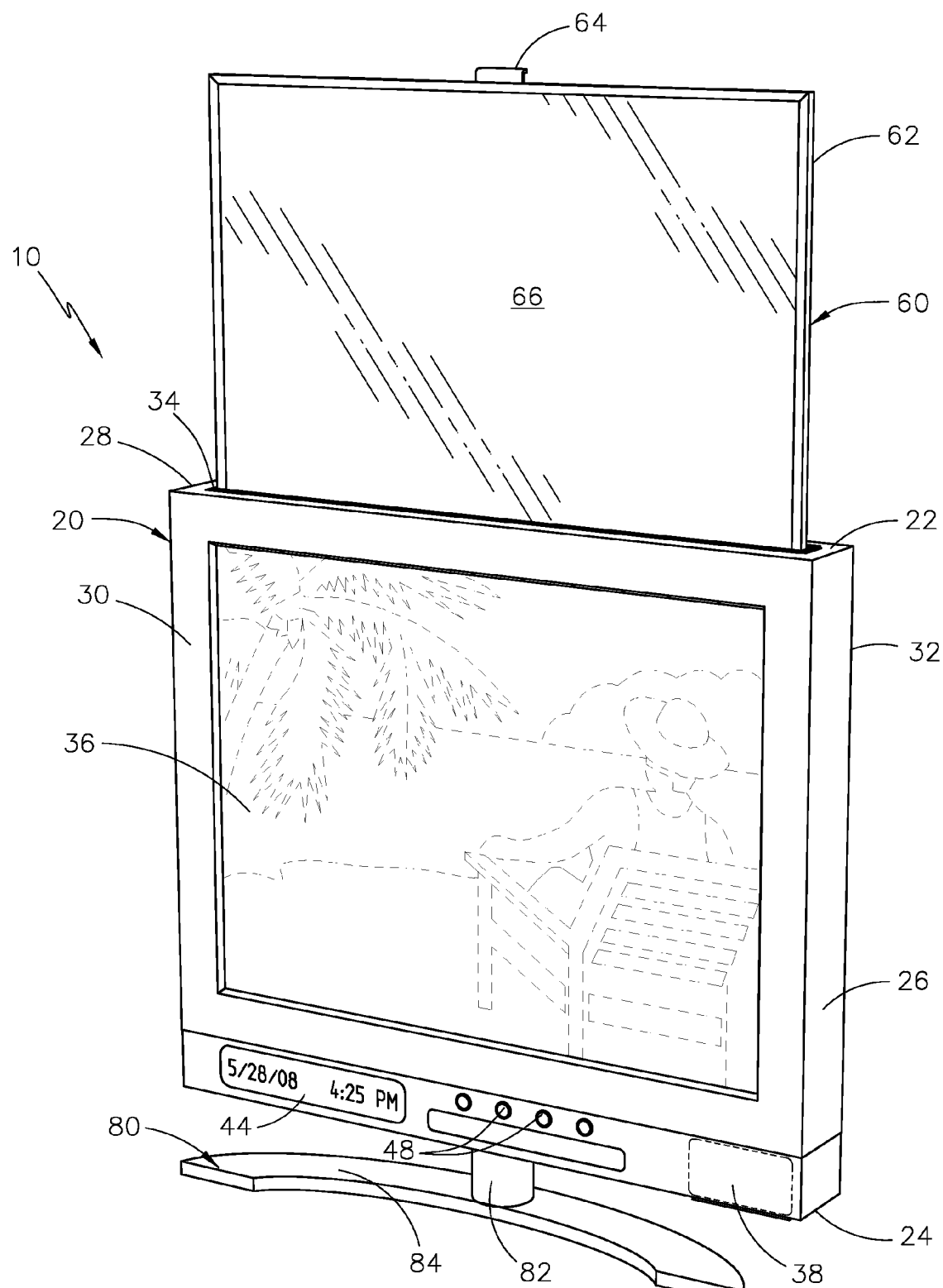
FIG. 7 is an isometric view of the instant invention seen in FIG. 5, with its mirror assembly in an extracted position.

As seen in FIGS. 5; 6; and 7, an alternate embodiment of instant invention 10 is presented. This illustrated alternated embodiment basically includes the same components as that of the preferred embodiment illustrated in FIGS. 1; 2; and 3. One difference being that aperture 34 is not longitudinally disposed in between top wall 22 and bottom wall 24. Instead, it is disposed on top wall 22 in between lateral walls 26 and 28.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A digital picture frame with hidden mirror assembly, consisting of:
   A) a housing assembly comprising a top wall, a bottom wall, first and second lateral walls, a front wall, and a rear wall, said housing assembly further comprises a laminate that covers an adhesive layer that in turn covers said rear wall, said housing assembly also having a battery compartment, said front wall defines a frame for a visual display unit that displays multiple photos in a slideshow format that are generated from an output of devices without producing a permanent record, said multiple photos are stored in a computer chip inserted into said housing assembly, said visual display unit is a liquid crystal display that is powered by a battery source within said battery compartment, said housing assembly also comprises a digital display illustrating date and time, and control buttons, said housing assembly not having a keyboard;
   B) a rail assembly housed and internally mounted within said housing assembly, said rail assembly comprises a dividing wall, said rail assembly further comprises a top rail that extends a first predetermined distance across a top edge from said dividing wall, and a bottom rail that extends a second predetermined distance across a bottom edge from said dividing wall, said top rail is in an inverted position with respect to said bottom rail, said top and bottom rails comprise a first at least one stopper having cooperative dimensions and shape to permit said mirror assembly to snugly slide in and out along said top and bottom rails;
   C) a mirror assembly comprising a frame with a handle and a mirror, said mirror assembly is slidably mounted onto said rail assembly, said frame comprises a second at least one stopper that prevents said mirror assembly from sliding completely out of said rail assembly when meeting said first at least one stopper; and
   D) a removable base assembly comprising a post extending from a base.

* * * * *